United States Patent Office 3,376,337
Patented Apr. 2, 1968

3,376,337
PREPARATION OF DICARBOXYLIC ACID MONOAMIDES
Bernard Pierre Brossard, Lyon, France, assignor to Rhone-Poulenc S.A., Paris, France, a French body corporate
No Drawing. Filed Oct. 22, 1965, Ser. No. 502,578
Claims priority, application France, Oct. 30, 1964, 993,386
9 Claims. (Cl. 260—534)

This invention relates to the preparation of aliphatic dicarboxylic acid monoamides.

It is known to prepare adipamic acid $$(HOOC-(CH_2)_4-CONH_2)$$

by reacting the 6-carboxyamidoxime of the formula:

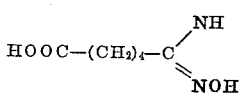

in the cold with nitrous acid [Godt, J. Amer. Chem. Soc. 78, 1461–1464 (1956)], this 6-carboxyamidoxime being itself prepared by catalytic hydrogenation of adipomononitrolic acid ($HOOC-(CH_2)_4-C(NO_2):NOH$) in glacial acetic acid.

It is also known to hydrogenate adipomononitrolic acid catalytically in neutral medium at a temperature not exceeding 20° C., the product being monoadipamidine ($HOOC-(CH_2)_4-C(NH_2):NH$) [C.R. 257, 668–670 (1963)].

It has now been found that it is possible to convert nitrolic acids directly into amidocarboxylic acids by catalytic hydrogenation under superatmospheric pressure, e.g. at least 10 bars, in neutral medium, the temperature of the reaction mass being gradually raised from not above ambient temperature to 100–120° C.

The present invention provides a process for the preparation of aliphatic dicarboxylic acid monoamides of the general formula:

$$HOOC-R-CONH_2 \quad (I)$$

in which R represents a substituted or unsubstituted polymethylene radical of 2 to 10 carbon atoms, which comprises hydrogenating a nitrolic acid of formula:

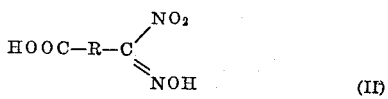

where R is as hereinbefore described under superatmospheric hydrogen pressure in the presence of a hydrogenation catalyst and enough of a base to give a substantially neutral reaction mixture, the temperature being initially not above ambient temperature and being raised during the course of the reaction to 100° to 120° C.

This invention is especially useful for the preparation of adipamic acid from adipomononitrolic acid (or 6-nitro-6-hydroximinohexanoic acid).

Nitrolic acids of Formula II can be obtained by the nitric acid oxidation of cycloaliphatic alcohols, e.g. cyclohexanol or cyclooctanol, at temperature of 10° to 35° C. Thus, adipomononitrolic acid can be obtained by the nitric acid oxidation at ambient temperature of cyclohexanol, or of a mixture of cyclohexanol and cyclohexanone obtained by the oxidation of cyclohexane by air.

In the new process the nitrolic acid employed may be neutralised by the addition of an alkaline agent such as an alkali metal hydroxide or carbonate, ammonia or a nitrogenous organic base such as pyridine, trimethylamine or triethylamine. This alkaline agent may be added as a concentrated aqueous solution or as a solution in an inert organic solvent such as dioxan or methanol. An aqueous ammonia solution is particularly suitable. A sufficient quantity of the alkali is added to the reaction mass to ensure a pH of 6 to 8 before the hydrogenation begins.

The hydrogenation is carried out with molecular hydrogen at a pressure above 10 bars, preferably 50 to 110 bars, in the presence of a known hydrogenation catalyst such as palladium, platinum or a Raney metal, such as Raney nickel. The proportion of catalyst will generally be from 2 to 10% of the weight of the nitrolic acid.

As nitrolic acids are unstable at elevated temperature, the reaction mixture must initially be maintained at ambient temperature until the nitrolic acid has disappeared, and is subsequently gradually heated to a temperature of about 100–120° C. The progress of the reaction may be followed by measuring the hydrogen absorbed, and the reaction stopped when the theoretical amount is reached.

The desired amido-acid, which is a solid product, sparingly soluble in water, can be isolated by acidification of the reaction mass, and then separated by filtration or other known means.

The following example illustrates the invention.

Example

Into a 250 cc. autoclave are charged 19.1 g. of 6-nitro-6-hydroximonohexanoic acid and 80 cc. of water. The mixture is neutralised to a pH value of 8 by the addition of 10 cc. of 20% ammonia, and 1 g. of Raney nickel is added. The air is purged and a hydrogen pressure of 100 bars is established and maintained for 24 hours, the autoclave being agitated and the temperature of the mixture being maintained at 20° C. The reaction mass is then heated at 100° C. for 24 hours.

After cooling, the catalyst is separated by filtration and the filtrate is evaporated to dryness. 15.40 g. of a residue are thus obtained to which a normal aqueous hydrochloric acid is added to give a mixture of pH 2.

The precipitate is filtered off, washed with 50 cc. of water and then with 3×50 cc. of acetone, and dried in vacuo at 50° C. 11 g. of adipamic acid, M.P. 160° C., are thus obtained, a yield of 76%.

We claim:
1. Process for the preparation of an aliphatic dicarboxylic acid monoamide of the formula:

$$HOOC-R-CONH_2$$

in which R is a polymethylene radical of 2 to 10 carbon atoms, which comprises hydrogenating a nitrolic acid of formula:

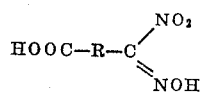

where R is as hereinbefore defined, under superatmospheric hydrogen pressure in the presence of a hydrogenation catalyst and enough of a base to give a substantially neutral reaction mixture, the temperature being initially not above ambient temperature and being raised during the course of the reaction to 100° to 120° C.

2. Process according to claim 1 in which R is $(CH_2)_4$.
3. Process according to claim 1 in which the hydrogen pressure is at least 10 bars.
4. Process according to claim 3 in which the hydrogen pressure is 50 to 110 bars.
5. Process according to claim 1 in which the base is ammonia.
6. Process according to claim 1 in which the hydrogenation catalyst is Raney nickel.
7. Process for the preparation of an aliphatic dicarboxylic acid monoamide of the formula:

$$HOOC-(CH_2)_n-CONH_2$$

in which $n$ is 2 to 10 inclusive, which comprises hydrogenating a nitrolic acid of formula:

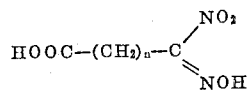

in which $n$ is as hereinbefore defined, under a hydrogen pressure of 50 to 110 bars in the presence of a hydrogenation catalyst and enough ammonia to give a substantially neutral reaction mixture, the temperature being not above ambient temperature until the nitrolic acid has disappeared and being subsequently raised to 100° to 120° C.

8. Process according to claim 7 in which $n$ is 4.
9. Process according to claim 7 in which the hydrogenation catalyst is Raney nickel.

References Cited

UNITED STATES PATENTS 2,851,489  9/1958  Godt, et al. ......... 260—534
2,929,841  3/1960  Godt ............... 260—534

LORRAINE A. WEINBERGER, *Primary Examiner.*

A. P. HALLUIN, *Assistant Examiner.*